(12) United States Patent
Kagawa et al.

(10) Patent No.: US 8,741,033 B2
(45) Date of Patent: Jun. 3, 2014

(54) AIR POLLUTION CONTROL APPARATUS

(75) Inventors: Seiji Kagawa, Tokyo (JP); Yoshito Tanaka, Tokyo (JP); Jun Hashimoto, Tokyo (JP); Hiroshi Kawane, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 760 days.

(21) Appl. No.: 12/694,811

(22) Filed: Jan. 27, 2010

(65) Prior Publication Data

US 2011/0011267 A1 Jan. 20, 2011

(30) Foreign Application Priority Data

Jul. 17, 2009 (JP) .................................. 2009-169323

(51) Int. Cl.
*B01D 47/00* (2006.01)

(52) U.S. Cl.
USPC .................... 96/235; 96/176; 96/262; 95/155; 95/157; 95/242

(58) Field of Classification Search
None
See application file for complete search history.

(56) References Cited

U.S. PATENT DOCUMENTS

| | | | |
|---|---|---|---|
| 3,969,479 A | | 7/1976 | Lonnes et al. |
| 3,989,465 A | * | 11/1976 | Onnen .......................... 422/110 |
| 4,351,804 A | | 9/1982 | Biedell et al. |
| 4,460,552 A | | 7/1984 | Zakrzewski |
| 4,687,649 A | * | 8/1987 | Kuroda et al. ............ 423/243.03 |
| 5,648,048 A | | 7/1997 | Kuroda et al. |
| 2001/0043898 A1 | | 11/2001 | Stoltz et al. |
| 2003/0000388 A1 | * | 1/2003 | Tomimatsu et al. .............. 96/44 |
| 2005/0271569 A1 | * | 12/2005 | Pehkonen et al. .......... 423/242.1 |
| 2007/0014712 A1 | * | 1/2007 | Pehkohen et al. ........ 423/244.07 |
| 2007/0059229 A1 | | 3/2007 | Temple et al. |

FOREIGN PATENT DOCUMENTS

| | | |
|---|---|---|
| DE | 1098491 B | 2/1961 |
| DE | 2553675 A1 | 10/1976 |
| FR | 2584945 A1 | 1/1987 |
| JP | 52-148480 A | 12/1977 |
| JP | 57-007227 A | 1/1982 |
| JP | 60-058230 A | 4/1985 |
| JP | 09-038455 A | 2/1997 |

(Continued)

OTHER PUBLICATIONS

European Search Report dated Nov. 15, 2010, issued in corresponding European Patent Application No. 10151761.3.

(Continued)

*Primary Examiner* — Duane Smith
*Assistant Examiner* — Pankti Patel
(74) *Attorney, Agent, or Firm* — Westerman, Hattori, Daniels & Adrian, LLP

(57) ABSTRACT

An air pollution control apparatus 1 includes: an absorber 2 that serves as a passage for flue gas; an absorbent spraying unit 5 that sprays an absorbent into the absorber 2; and a reservoir tank 3 that reserves therein the absorbent. The air pollution control apparatus 1 brings the flue gas into gas-liquid contact with the absorbent to process the flue gas, while sending the flue gas in the absorber 2. The air pollution control apparatus 1 also collects and reserves therein the absorbent after processing the flue gas in the reservoir tank 3. The air pollution control apparatus 1 also includes a defoaming agent diffusing unit 6 that diffuses a defoaming agent over foams of the absorbent in the reservoir tank 3.

7 Claims, 6 Drawing Sheets

(56) References Cited

FOREIGN PATENT DOCUMENTS

| JP | 2734499 B2 | 3/1998 | | |
| JP | 11244649 A | * 9/1999 | ............. | B65D 90/22 |
| JP | 11268796 A | * 10/1999 | ............. | B01D 53/34 |
| JP | 2001-120947 A | 5/2001 | | |
| JP | 2001-276506 A | 10/2001 | | |
| JP | 2002-001042 A | 1/2002 | | |
| JP | 2002-248319 A | 9/2002 | | |
| JP | 3388984 B2 | 3/2003 | | |
| JP | 3392660 B2 | 3/2003 | | |
| JP | 2005-193133 A | 7/2005 | | |
| JP | 2005-211792 A | 8/2005 | | |
| JP | 2007-051555 A | 3/2007 | | |

OTHER PUBLICATIONS

Japanese Office Action dated Jul. 5, 2011, issued in corresponding Japanese Patent Application No. 2009-169323.

European Search Report Aug. 3, 2011, issued in corresponding European Patent Application No. 11166400.9.

Decision of a Patent Grant dated Jun. 12, 2012, issued in corresponding Japanese Patent Application No. 2009-169323, with English Translation (3 pages).

Notice of Allowance dated Jan. 31, 2013, issued corresponding Taiwanese Patent Application No. 099102438 (w/ English translation) (5 pages).

* cited by examiner

WHEN FLUE GAS IS NOT BEING PROCESSED
(DEFOAMING AGENT IS SPRINKLED)

WHEN FLUE GAS IS BEING PROCESSED
(DEFOAMING AGENT IS NOT SPRINKLED)

AIR POLLUTION CONTROL APPARATUS

TECHNICAL FIELD

The present invention relates to an air pollution control apparatus, and more particularly, to an air pollution control apparatus that can prevent a defect caused by foams in an absorbent.

BACKGROUND ART

An air pollution control apparatus processes flue gas in various plants and boilers, and generally includes an absorber that serves as a passage for the flue gas; an absorbent spraying unit that sprays an absorbent into the absorber; and a reservoir tank that reserves therein the absorbent. The flue gas is processed by being brought into gas-liquid contact with the absorbent, while sending the flue gas from the lower area to the upper area of the absorber (or from the upper area to the lower area). After processing the flue gas, the absorbent is collected and reserved in the reservoir tank.

If a plant uses heavy oil as a fuel, for example, unburned fuel contained in the flue gas becomes concentrated in the reservoir tank, and produces foams in the absorbent. The amount of produced foams cannot be controlled by an apparatus design or an operation condition, because such an amount depends on factors such as the fuel and the absorbent. If a large amount of foams is produced, a flue gas processing pressure loss could rise abnormally, or the foams might overflow, to damage equipments. Therefore, a conventional air pollution control apparatus extracts and breaks the foams produced in the absorbent. Known examples of the conventional air pollution control apparatus having such a structure are disclosed in Japanese Patent No. 3388984 and Japanese Patent No. 3392660.

In a recent air pollution control apparatus, an entrance is provided on the side of the absorber for guiding the flue gas into the absorber, and a flue gas duct is connected to the entrance. In such a structure, the flue gas enters the absorber from the entrance, and flows through the absorber, from the lower area to the upper area. Such a structure improves a desulfurization efficiency of the flue gas, in comparison with a structure in which the flue gas is guided into the absorber from the upper area. Known examples of a conventional air pollution control apparatus having such a structure are disclosed in Japanese Patent Application Laid-open No. 2005-193133 and Japanese Patent Application Laid-open No. 2005-211792.

CITATION LIST

Patent Literature

PATENT LITERATURE 1 Japanese Patent No. 3388984
PATENT LITERATURE 2 Japanese Patent No. 3392660
PATENT LITERATURE 3 Japanese Patent Application Laid-open No. 2005-193133
PATENT LITERATURE 4 Japanese Patent Application Laid-open No. 2005-211792

SUMMARY OF INVENTION

Technical Problem

If the entrance for the flue gas is arranged on the side of the absorber as described above, when a large amount of foams is produced, raising the level of a foam wavefront of the absorbent, the foam might flow back into the flue gas duct via the entrance on the absorber. Such a backward flow might cause corrosions in the flue gas duct, due to substances such as chlorine contained in the foams (the absorbent).

The present invention is made in consideration above. An object of the present invention is to provide an air pollution control apparatus that can prevent a defect caused by foams produced in the absorbent.

Solution to Problem

According to an aspect of the present invention, an air pollution control apparatus includes: an absorber that serves as a passage for flue gas; an absorbent spraying unit that sprays an absorbent into the absorber; and a reservoir tank that reserves therein the absorbent. The flue gas is brought into gas-liquid contact with the absorbent in the absorber to process the flue gas, the absorbent after processing the flue gas is collected into and reserved in the reservoir tank, and the air pollution control apparatus further comprises a defoaming agent diffusing unit that diffuses a defoaming agent over foams of the absorbent in the reservoir tank.

The defoaming agent diffusing unit is installed in the air pollution control apparatus to diffuse the defoaming agent over the foams of the absorbent in the reservoir tank. In such a structure, when the foams are produced in the absorbent in the reservoir tank, the defoaming agent diffusing unit diffuses the defoaming agent over the foam wavefront. In this manner, the absorbent is defoamed, and a defect caused by the foams of the absorbent can advantageously be prevented.

Advantageously, in the air pollution control apparatus, an entrance for the flue gas is arranged on a side of the absorber, the reservoir tank is arranged at a bottom of the absorber and opens into the absorber, the flue gas is brought into gas-liquid contact with the absorbent to process the flue gas while the flue gas is sent from a lower area toward an upper area of the absorber, and the defoaming agent diffusing unit is arranged above a foam wavefront of the absorbent in the reservoir tank, and below the entrance.

In this air pollution control apparatus, because the defoaming agent diffusing unit is arranged below the entrance (at a position offset from the passage of the flue gas), the diffused defoaming agent is less influenced by the flow of the flue gas, in comparison with a structure in which the defoaming agent diffusing unit is arranged above the entrance. In this manner, the defoaming agent is diffused appropriately, thus preventing a defect caused by the foams of the absorbent effectively.

Advantageously, in the air pollution control apparatus, the defoaming agent diffusing unit is arranged on a same plane as a plane on which the entrance is arranged.

In this air pollution control apparatus, because the defoaming agent is diffused from the defoaming agent diffusing unit over the foam wavefront of the absorbent near the entrance, the backflow of the foams into the entrance, caused by the rising foam wavefront, is effectively suppressed. In this manner, a defect caused by the foams of the absorbent can be prevented effectively.

Advantageously, in the air pollution control apparatus, a plurality of defoaming agent diffusing units is arranged along a boundary between a liquid surface of the absorbent in the reservoir tank and the entrance.

In this air pollution control apparatus, because the defoaming agent is diffused from the defoaming agent diffusing units over the foam wavefront of the absorbent near the entrance, the backflow of the foams into the entrance, caused by the rising foam wavefront, is effectively suppressed. In this manner, a defect caused by the foams of the absorbent can be prevented effectively.

Advantageously, in the air pollution control apparatus, the defoaming agent diffusing unit diffuses the defoaming agent when processing of the flue gas is stopped.

This air pollution control apparatus is advantageous in that a problem caused by an increase in the flow rate of the absorbent due to the diffused defoaming agent is less likely to occur.

Advantageously, in the air pollution control apparatus, the defoaming agent diffusing unit is arranged in a detachable manner.

In this air pollution control apparatus, the defoaming agent diffusing unit can advantageously be removed from the absorber when the absorber is processing the flue gas, in comparison with a structure in which the diffusing nozzle is permanently installed. The defoaming agent diffusing unit can be maintained more easily as well.

Advantageously, the air pollution control apparatus further includes a foam-breaking unit that extracts and breaks the foams of the absorbent in the reservoir tank. An entrance for the flue gas is arranged on a side of the absorber, and the foam-breaking unit extracts the foams of the absorbent from a position facing the entrance in the absorber and breaks the foams.

In this air pollution control apparatus, because the entrance of the flue gas is arranged on the side of the absorber, the foams of the absorbent are pushed and accumulated against the absorber wall that faces the entrance, due to the air pressure of the flue gas entering the absorber through the entrance. Because the foam-breaking unit extracts the foams of the absorbent at this position (the position facing the entrance in the absorber), the absorbent is defoamed effectively. In this manner, the foam-breaking process is performed efficiently, to prevent a defect caused by the foams of the absorbent effectively.

Advantageously, in the air pollution control apparatus, an entrance for the flue gas is arranged on a side of the absorber, a flue gas duct for supplying the flue gas into the absorber is connected to the entrance, and the air pollution control apparatus further comprises a draining unit that collects a liquid flowing into the flue gas duct.

In this air pollution control apparatus, when the foam wavefront of the absorbent rises in the reservoir tank, and the foams of the absorbent flow back into the flue gas duct, the foams are collected by the draining unit. In this manner, the corrosions of the flue gas duct, caused by the foams flowing backwardly, are suppressed advantageously.

Advantageously, in the air pollution control apparatus, the reservoir tank is arranged at a bottom of the absorber, and opens into the absorber, and the air pollution control apparatus further comprises a dispersing unit that disperses the absorbing liquid falling and collected into the reservoir tank from the absorber through an opening of the reservoir tank.

In this air pollution control apparatus, because the absorbent falling from the absorber unevenly is dispersed by the dispersing unit, and collected into the reservoir tank, the absorbent is suppressed from foaming in the reservoir tank, in comparison with a structure without a dispersing unit. In this manner, a defect caused by the foams of the absorbent can be prevented effectively.

According to another aspect of the present invention, an air pollution control apparatus includes: an absorber that serves as a passage for flue gas; an absorbent spraying unit that sprays an absorbent into the absorber; a reservoir tank that reserves therein the absorbent. The flue gas is brought into gas-liquid contact with the absorbent in the absorber to process the flue gas, the absorbent after processing the flue gas is collected into and reserved in the reservoir tank, the air pollution control apparatus further comprises a foam-breaking unit that extracts and break foams of the absorbing unit in the reservoir tank, an entrance for the flue gas is arranged on a side of the absorber, and the foam-breaking unit extracts the foams of the absorbent from a position facing the entrance in the absorber and breaks the foams.

According to still another aspect of the present invention, an air pollution control apparatus includes: an absorber that serves as a passage for flue gas; an absorbent spraying unit that sprays an absorbent into the absorber; a reservoir tank that reserves therein the absorbent. The flue gas is brought into gas-liquid contact with the absorbent in the absorber to process the flue gas, the absorbent after processing the flue gas is collected into and reserved in the reservoir tank, an entrance for the flue gas is arranged on a side of the absorber, a flue gas duct for supplying the flue gas into the absorber is connected to the entrance, and the air pollution control apparatus further comprises a draining unit that collects a liquid flowing into the flue gas duct.

According to still another aspect of the present invention, an air pollution control apparatus includes: an absorber that serves as a passage for flue gas; an absorbent spraying unit that sprays an absorbent into the absorber; and a reservoir tank that reserves therein the absorbent. The flue gas is brought into gas-liquid contact with the absorbent in the absorber to process the flue gas, the absorbent after processing the flue gas is collected into and reserved in the reservoir tank, the reservoir tank is arranged at a bottom of the absorber, and opens into the absorber and the air pollution control apparatus further comprises a dispersing unit that disperses the absorbing liquid falling and collected into the reservoir tank from the absorber through an opening of the reservoir tank.

Advantageous Effects of Invention

In the air pollution control apparatus according to the present invention, the defoaming agent diffusing unit is installed for diffusing the defoaming agent over the foams of the absorbent in the reservoir tank. In such a structure, when the absorbent becomes foamed in the reservoir tank, the defoaming agent diffusing unit diffuses the defoaming agent over the foam wavefront. In this manner, the absorbent is defoamed, preventing a defect caused by the foams of the absorbent.

DESCRIPTION OF EMBODIMENTS

An embodiment of an air pollution control apparatus according to the present invention will now be explained in detail with reference to the drawings. The embodiment disclosed herein is not intended to limit the scope of the present invention in any way. Moreover, structural elements disclosed in the embodiment include those that can be replaced or obviously replaceable while maintaining the identity of the present invention. A plurality of variations disclosed in the embodiment may be combined in any way within a scope that is obvious to those in the art.

[Air Pollution Control Apparatus]

An air pollution control apparatus 1 is applied, for example, to a flue gas desulfurization apparatus for reducing sulfur oxide contained in the flue gas emitted from various plants or boilers. In the air pollution control apparatus 1, an absorbent (for example, an aqueous solution of an alkaline agent) is sprayed in a shape of a column toward the upper area of the absorber, and the flue gas is brought into gas-liquid contact with the absorbent, to reduce sulfur oxide contained in the flue gas (wet processing).

Figure 1:
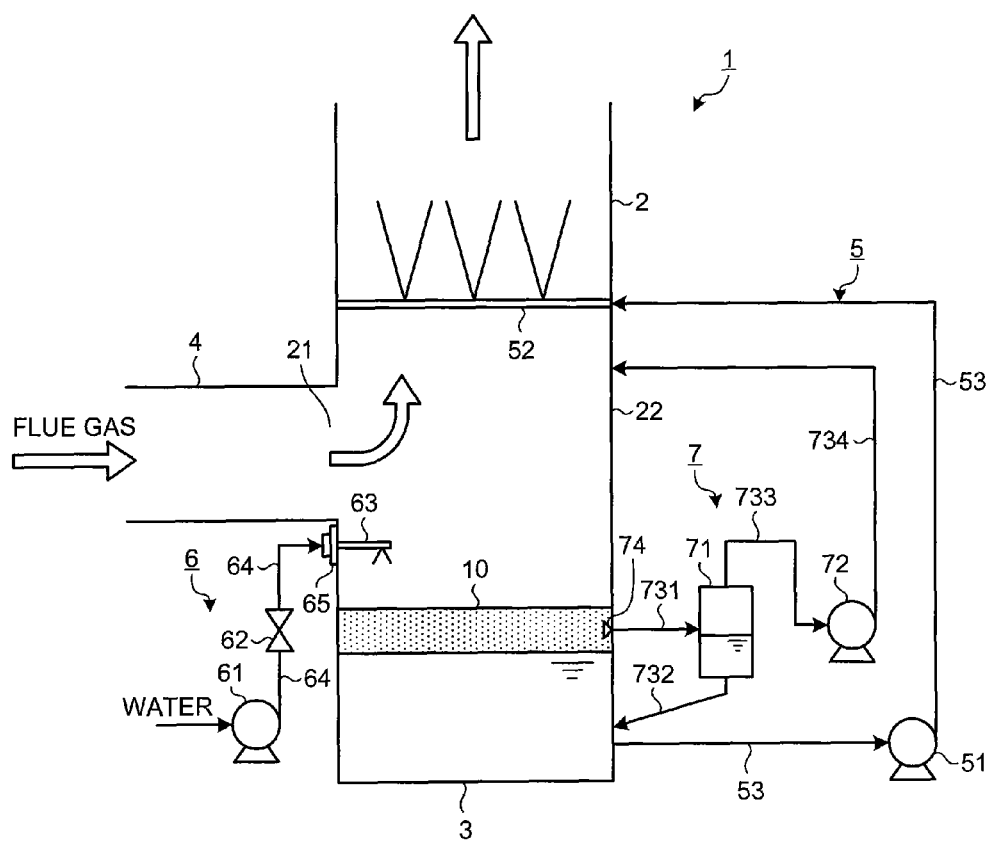
FIG. 1 is a schematic of a structure of an air pollution control apparatus according to an embodiment of the present invention.

In the embodiment, the air pollution control apparatus 1 is applied to an air pollution control structure in which the absorbent is sprayed in a shape of a column from the lower area toward the upper area of an absorber 2, while sending the flue gas from the lower area to the upper area of the absorber 2, bringing the flue gas into gas-liquid contact with the absorbent (see FIG. 1). The air pollution control apparatus 1 is not limited to such a structure, and may also be applied to, for example, an air pollution control structure (not shown) in which the absorbent is sprayed in a shape of a column from the lower area toward the upper area of the absorber 2, while sending the flue gas from the upper area down to the lower area of the absorber 2, bringing the flue gas into gas-liquid contact with the absorbent.

Figure 2:
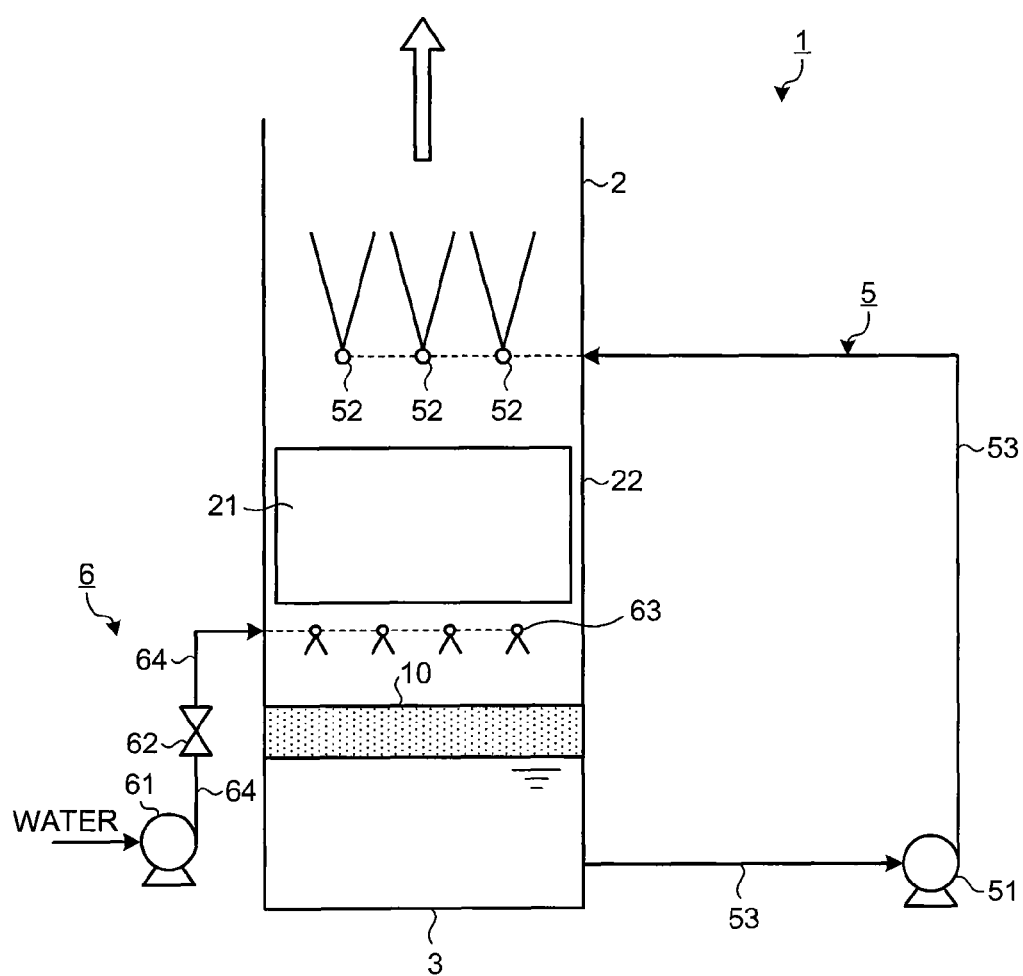
FIG. 2 is an illustrative schematic of an arrangement of sprinkling units included in the air pollution control apparatus shown in FIG. 1.

The air pollution control apparatus 1 includes the absorber 2, a reservoir tank 3, a flue gas duct 4, and an absorbent spraying unit 5 (see FIGS. 1 and 2).

The absorber 2 serves as a passage for the flue gas, and has a hollow structure. In the embodiment, a body 22 of the absorber 2 has a tubular structure with a rectangular cross section. The longitudinal side of the absorber 2 is arranged vertically. An entrance 21 is arranged on the side of the absorber 2 near the bottom thereof. An exit (not shown) for the flue gas is provided at the top of the absorber 2. Therefore, the flue gas enters the body 22 via the entrance 21 provided on the side of the absorber 2, and flows in the body 22 from the lower area to the upper area thereof. Such a structure in which the flue gas enters the absorber 2 from the side thereof can desulfurize the flue gas more efficiently, in comparison with a structure in which the flue gas is guided into the absorber from the upper area.

The reservoir tank 3 reserves therein the absorbent, and located at the bottom of the absorber 2. According to the embodiment, for example, the reservoir tank 3 has a shape of a container, and is integrated with the body 22 of the absorber 2, forming the bottom of the absorber 2. Therefore, the reservoir tank 3 opens into the passage of the flue gas at the bottom of the absorber 2. The absorbent fell in the absorber 2 is collected and reserved in the reservoir tank 3. The reservoir tank 3 also includes an aerating unit that supplies air into the absorbent, and a stirring unit that stirs the absorbent (not shown).

The flue gas duct 4 is a duct for guiding the flue gas into the absorber 2, and is connected to the entrance 21 on the side of the absorber 2. In the embodiment, for example, the entrance 21 on the side of the absorber 2 has the same width as that of the passage of the gas, and the flue gas duct 4 is horizontally connected to the entrance 21.

The absorbent spraying unit 5 sprays the absorbing unit into the absorber 2, and includes a pump 51 and a spraying pipe 52. The pump 51 pumps up the absorbent in the reservoir tank 3 and supplies the absorbent into the spraying pipe 52. The pump 51 is connected to the reservoir tank 3 and the spraying pipe 52, via pipes 53 and 53, respectively. The spraying pipe 52 sprays the absorbent into the absorber 2, and is arranged inside the absorber 2. In the absorbent spraying unit 5, when the pump 51 is driven, the absorbent in the reservoir tank 3 is pumped up via the pipe 53, and supplied into the spraying pipe 52. The absorbent is then sprayed from the spraying pipe 52 into the passage of the flue gas in the absorber 2. In the embodiment, the spraying pipe 52 sprays the absorbent in a shape of a column from the vertical lower area toward the vertical upper area of the absorber 2, in the passage of the flue gas in the absorber 2 (a liquid column spray pipe).

In the air pollution control apparatus 1, the flue gas (unprocessed gas) enters the absorber 2 via the flue gas duct 4, and flows from the vertical lower area toward the vertical upper area of the absorber 2. When the absorbent is sprayed from the spraying pipe 52 into the absorber 2, the absorbent is brought into gas-liquid contact with the flue gas to absorb sulfur oxide contained in the flue gas. In this manner, the flue gas is processed (a desulfurization process). The absorbent that has absorbed the sulfur oxide falls down in the absorber 2 to be collected in the reservoir tank 3 at the bottom thereof. The absorbent is then pumped up by the pump 51, and sprayed again into the absorber 2 via the spraying pipe 52. In this manner, the absorbent is circulated to process the flue gas continuously. The processed flue gas is released out from the exit located on the top of the absorber 2, and sent into a next processing apparatus.

[Defoaming Agent Diffusing Unit]

If a plant uses heavy oil as a fuel, for example, unburned fuel contained in the flue gas becomes concentrated in the reservoir tank, and produces foams in the absorbent. The amount of produced foams cannot be controlled by an apparatus design or an operation condition, because such an amount depends on factors such as the fuel and the absorbent. If a large amount of foams is produced, a flue gas processing pressure loss can rise abnormally, or the foams might overflow, to damage equipments.

Especially in a structure in which the entrance of the flue gas is arranged on the side of the absorber, if a large amount of foams is produced, raising the level of a foam wavefront of the absorbent, the foams might flow back into the flue gas duct via the entrance on the absorber. Such a backward flow might cause corrosions in the flue gas duct, due to substances such as chlorine contained in the foams (the absorbent).

Therefore, to reduce the foams of the absorbent, the air pollution control apparatus 1 includes a defoaming agent diffusing unit (sprinkling unit) 6 (see FIGS. 1 and 2). The defoaming agent diffusing unit 6 diffuses a defoaming agent (e.g., water or absorbent slurry) over the foams of the absorbent in the reservoir tank 3, and includes a pump 61, a valve 62, and a diffusing nozzle 63 connected via pipes 64. The pump 61 supplies the defoaming agent into the diffusing nozzle 63. The valve 62 adjusts the amount of the defoaming agent to be supplied from the pump 61 into the diffusing nozzle 63. The valve 62 is an open-close valve, for example.

The diffusing nozzle 63 diffuses the defoaming agent. In the embodiment, for example, the diffusing nozzle 63 is an L-shaped pipe having a length of 150 millimeters. The tip of the diffusing nozzle 63 is inserted into the absorber 2 from the side thereof, and attached to the side of the absorber 2 (or the opening of the reservoir tank 3) via an attaching flange 65. The tip of the diffusing nozzle 63 is also positioned higher than a foam wavefront 10 of the absorbent in the reservoir tank 3, and sprays the diffused agent to the lower area of the absorber 2 (over the foam wavefront 10 of the absorbent).

In the air pollution control apparatus 1, when foams are produced in the absorbent in the reservoir tank 3, the defoaming agent is diffused from the diffusing nozzle 63 in the defoaming agent diffusing unit 6 over the foam wavefront 10. The absorbent is then defoamed by the defoaming agent, bringing down the level of the foam surface of the absorbent. In this manner, a defect caused by the foams of the absorbent can be prevented.

Figure 3:
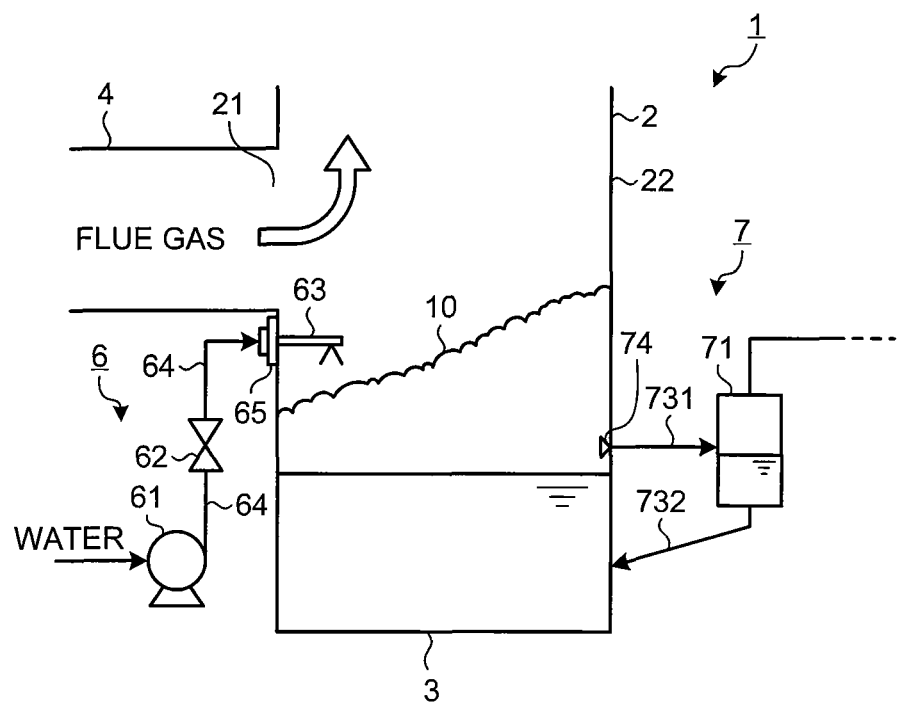
FIG. 3 is an illustrative schematic of an advantageous effect of the air pollution control apparatus shown in FIG. 1.

Furthermore, in the embodiment, the entrance 21 of the flue gas is arranged on the side of the absorber 2; and the reservoir tank 3 is located at the bottom of the absorber 2, and opens into the passage of the flue gas in the absorber 2 (see FIGS. 1 and 2). The diffusing nozzle 63 is arranged above the foam wavefront 10 of the absorbent in the reservoir tank 3, and below the entrance 21 on the absorber 2. In such a structure, the flue gas enters the entrance 21 on the side of the absorber 2, and rises vertically in the absorber 2. Because the diffusing nozzle 63 is located below the entrance 21 (at a position offset from the passage of the flue gas), the diffused defoaming agent is less influenced by the flow of the flue gas (see FIG. 3), in comparison with a structure (not shown) in which the diffusing nozzle is arranged above the entrance. In this manner, the defoaming agent is diffused appropriately, to defoam the absorbent effectively.

Furthermore, in the embodiment, the diffusing nozzle 63 of the defoaming agent diffusing unit 6 is arranged on the same plane as the entrance 21 on the absorber 2 (see FIGS. 1 and 2). In other words, the entrance 21 for the flue gas opens to the side of the absorber 2, and the diffusing nozzle 63 is inserted into the absorber 2 via the wall surface on which the entrance 21 is arranged. Therefore, the diffusing nozzle 63 and the entrance 21 are arranged on the same wall surface in the absorber 2, and the diffusing nozzle 63 is arranged between the entrance 21 and the foam wavefront 10 of the absorbent. In such a structure, because the defoaming agent is diffused over the foam wavefront 10 of the absorbent via the diffusing nozzle 63 near the entrance 21, the foam wavefront 10 is suppressed from rising near the entrance 21. In this manner, the foams are effectively suppressed from flowing back into the entrance 21 (see FIG. 3).

Furthermore, in the embodiment, a plurality of diffusing nozzles 63 is arranged along the boundary between the surface of the absorbent in the reservoir tank 3 and the entrance 21 on the absorber 2 (see FIG. 2). More specifically, the entrance 21 of the flue gas has a rectangular shape having an approximately the same width as the side of the absorber 2. The diffusing nozzles 63 are arranged below the entrance 21, and above the foam wavefront 10 of the absorbent. The diffusing nozzles 63 are arranged horizontally, with a predetermined interval therebetween, along the boundary between the foam wavefront 10 of the absorbent and the lower edge of the opening of the entrance 21. In such a structure, because the defoaming agent is diffused over the foam wavefront 10 of the absorbent via the diffusing nozzles 63 near the entrance 21, the backflow of the foams, caused by the rising foam wavefront 10, into the entrance 21 is effectively suppressed (see FIG. 3). Each of the diffusing nozzles 63 is commonly connected to the pump 61 and the valve 62. The absorber 2 is approximately 10 meters in width, and four diffusing nozzles 63 are arranged with an interval of approximately 2 meters therebetween.

Advantageous Effects

As described above, the air pollution control apparatus 1 includes the defoaming agent diffusing unit 6 for diffusing the defoaming agent over the foams of the absorbent in the reservoir tank 3 (see FIGS. 1 and 2). In such a structure, when the foams are produced in the absorbent in the reservoir tank 3, the defoaming agent diffusing unit 6 diffuses the defoaming agent over the foam wavefront 10. In this manner, the absorbent is defoamed, and a defect caused by the foams of the absorbent can be prevented advantageously.

Furthermore, in the air pollution control apparatus 1, the entrance 21 of the flue gas is arranged on the side of the absorber 2; the reservoir tank 3 is arranged at the bottom of the absorber 2, and opens into the absorber 2 (into the passage of the flue gas); the flue gas is brought into gas-liquid contact with the absorbent to process the flue gas, while sending the flue gas from the lower area of the absorber 2 toward the upper area thereof; the defoaming agent diffusing unit 6 (the diffusing nozzles 63) is arranged above the foam wavefront 10 of the absorbent in the reservoir tank 3 and below the entrance 21 on the absorber 2 (see FIGS. 1 and 2). Because, in such a structure, the defoaming agent diffusing unit 6 is located below the entrance 21 (at a position offset from the passage of the flue gas), the diffused defoaming agent is less influenced by the flow of the flue gas (see FIG. 3), in comparison with a structure (not shown) in which the diffusing nozzle is arranged above the entrance. In this manner, the defoaming agent is diffused appropriately, preventing a defect caused by the foams in the absorbent effectively. The position of the foam wavefront 10 of the absorbent can be set as appropriate in the reservoir tank 3, as an average position thereof when the air pollution control apparatus 1 is under steady operation.

Furthermore, in the structure described above, the defoaming agent diffusing unit 6 (the diffusing nozzles 63) is arranged on the same plane as the entrance 21 on the absorber 2 (see FIGS. 1 and 2). In such a structure, because the defoaming agent is diffused onto the foam wavefront 10 of the absorbent via defoaming agent diffusing unit 6 near the entrance 21, the backflow of the foams into the entrance 21, caused by the rising foam wavefront 10, is suppressed effectively (see FIG. 3). In this manner, a defect caused by the foams in the absorbent can be prevented advantageously.

Furthermore, in the structure described above, a plurality of defoaming agent diffusing units 6 (the diffusing nozzles 63) is arranged along the boundary between the surface of the absorbent in the reservoir tank 3 and the entrance 21 (see FIG. 2). In such a structure, because the defoaming agent is diffused over the foam wavefront 10 of the absorbent via the defoaming agent diffusing units 6 near the entrance 21, the backflow of the foams into the entrance 21, caused by the rising foam wavefront 10, is effectively suppressed (see FIG. 3). In this manner, a defect caused by the foams in the absorbent can be prevented advantageously.

[Timing for Diffusing Defoaming Agent]

If the defoaming agent diffusing unit keeps diffusing the defoaming agent during the time the air pollution control apparatus 1 is processing the flue gas, the flow rate of the absorbent can increase to degrade the flow rate balance of the absorbent in the absorber.

Therefore, in the air pollution control apparatus 1, the defoaming agent diffusing unit 6 preferably diffuses the defoaming agent when the air pollution control apparatus 1 is not processing the flue gas. Such a structure is advantageous in that a problem caused by an increase in the flow rate of the absorbent due to the diffusion of the defoaming agent is less likely to occur.

For example, according to the embodiment, the defoaming agent diffusing unit 6 can be detached from the absorber 2 (or the reservoir tank 3) (see FIG. 4). More specifically, the attaching flange 65 is installed on the side of the absorber 2 and below the flue gas duct 4 (the entrance 21 of the flue gas). The diffusing nozzle 63 of the defoaming agent diffusing unit 6 is attached to the attaching flange 65, and inserted into the absorber 2. Thus, the defoaming agent diffusing unit 6 can be easily detached from the side of the absorber 2.

Figure 4A:
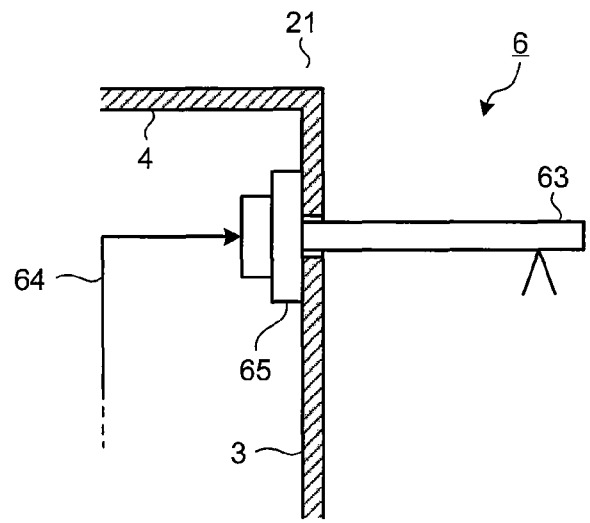
FIG. 4A and FIG. 4B are illustrative schematics of a defoaming agent diffusing unit included in the air pollution control apparatus shown in FIG. 1.
Figure 4B:
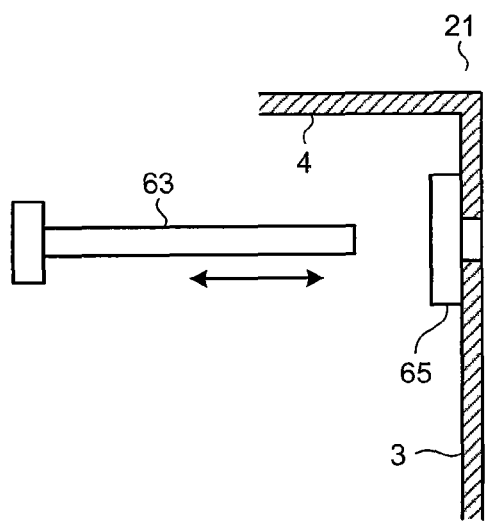

The defoaming agent is diffused (sprinkled) when the air pollution control apparatus 1 is not processing the flue gas (see FIG. 4A). At this time, the diffusing nozzle 63 of the defoaming agent diffusing unit 6 is attached to the attaching flange 65, and inserted into the absorber 2. When the air pollution control apparatus 1 is processing the flue gas, the diffusing nozzle 63 is detached from the attaching flange 65, and is removed from the absorber 2 (see FIG. 4B). A cap (not shown) is attached to the attaching flange 65 to seal the opening of the attaching flange 65. In this manner, the structure in which the defoaming agent diffusing unit 6 is detachable has an advantage that the diffusing nozzle 63 of the defoaming agent diffusing unit 6 can be removed from the absorber 2 while the air pollution control apparatus 1 is processing the flue gas, and the diffusing nozzle 63 can be maintained more easily, in comparison with a structure in which the diffusing nozzle is permanently installed.

The present invention is not limited to such a structure. In the air pollution control apparatus 1, the defoaming agent diffusing unit 6 may diffuse the defoaming agent as appropriate while the air pollution control apparatus 1 is processing the flue gas. For example, the diffusing nozzle may be permanently installed in the absorber (not shown), and the valve 62 is turned ON and OFF as required to adjust the timing of diffusing the defoaming agent. In this manner, the flow rate balance of the absorbent in the absorber 2 can be kept appropriate.

[Foam Breaker]

The air pollution control apparatus 1 preferably includes a foam-breaking unit 7 in addition to the defoaming agent diffusing unit 6 (see FIG. 1). The foam-breaking unit 7 extracts the foams of the absorbent from the reservoir tank 3, and performs a foam-breaking process. In the structure in which the entrance 21 of the flue gas is arranged on the side of the absorber 2, the foam-breaking unit 7 extracts the foams of the absorbent from a position facing the entrance 21 in the absorber 2 to perform the foam-breaking process. In such a structure, because the entrance 21 of the flue gas is arranged on the side of the absorber 2, the foams of the absorbent are pushed against and accumulated at the wall of the absorber 2 that faces the entrance 21 due to the air pressure of the flue gas entering the absorber 2 via the entrance 21 (see FIG. 3). At this time, because the foam-breaking unit 7 extracts the foams of the absorbent at this position (the position facing the entrance 21 in the absorber 2), the absorbent foams are broken effectively. With the effective foam-breaking process, a defect caused by the foams of the absorbent is prevented effectively. Furthermore, the foam wavefront 10 of the absorbent becomes the highest at this position. Therefore, by allowing the foam-breaking unit 7 to extract the foams in the absorbent at this position, the foam wavefront can be effectively suppressed from rising.

For example, according to the embodiment, the foam-breaking unit 7 includes a foam breaker 71 and a pump 72 connected via the pipes 731 to 734 (see FIG. 1). The foam breaker 71 breaks the foams of the absorbent. The foam breaker 71 may break the foams by sprinkling water, for example. A foam collecting opening 74 (an entrance into the pipe 731 for removing the foams) is arranged in a foam layer located above the surface of the absorbent in the reservoir tank 3 and below the foam wavefront 10. In the foam-breaking unit 7, the foams of the absorbent in the reservoir tank 3 is extracted through the collecting opening 74 into the pipe 731, and collected into the foam breaker 71. The foams are then broken in the foam breaker 71, and gas and liquid components are separated. The liquid component, separated in the foam-breaking process, is returned into the reservoir tank 3 from the foam breaker 71 via the pipe 732. The gas component is returned to the absorber 2 from the foam breaker 71 via the pipes 733 and 734.

[Draining Unit]

Figure 5:
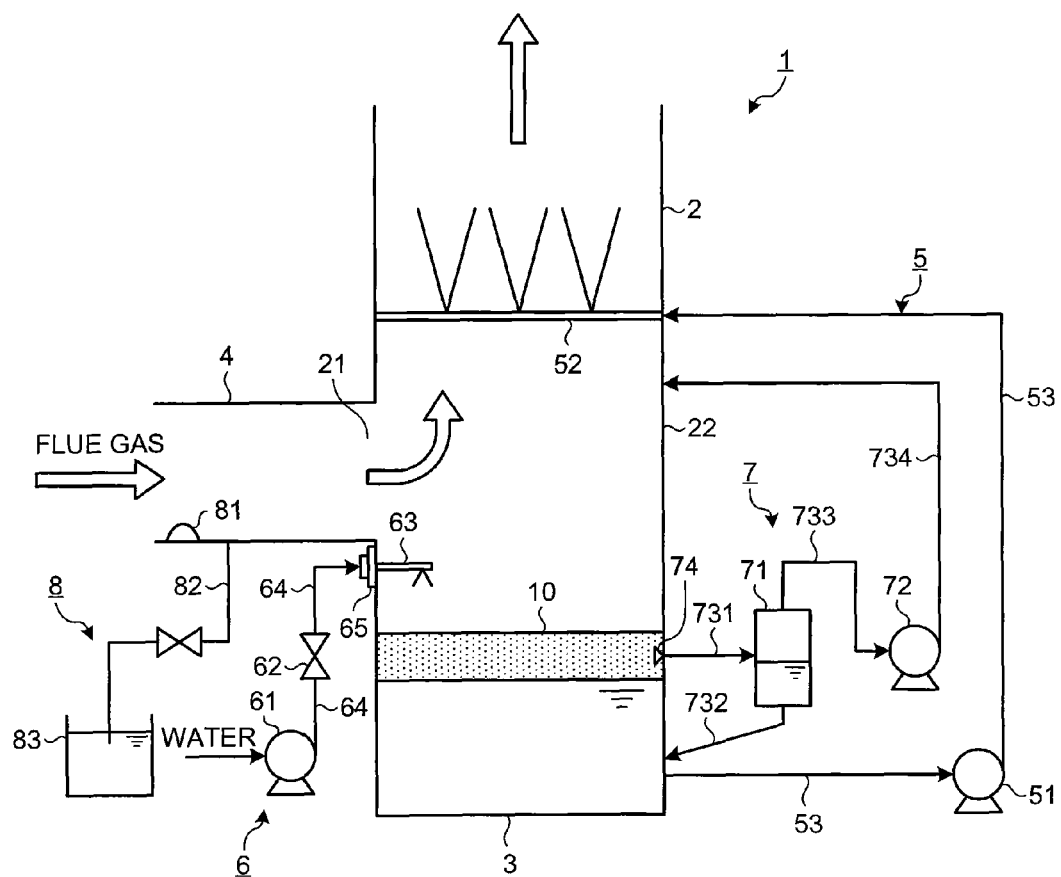
FIG. 5 is an illustrative schematic of a variation of the air pollution control apparatus shown in FIG. 1.

FIG. 5 is a schematic of a structure of a variation of the air pollution control apparatus shown in FIG. 1. In FIG. 5, the same structural elements as those in the air pollution control apparatus 1 are given the same references signs, and the explanations thereof are omitted herein.

The characteristic of this air pollution control apparatus 1 is in that a draining unit 8 is arranged in the flue gas duct 4 (see FIG. 5). More specifically, in the structure in which the entrance 21 of the flue gas is arranged on the side of the absorber 2 and the flue gas duct 4 is connected to the entrance 21 for supplying the flue gas into the absorber 2, the draining unit 8 is provided for collecting the liquid (the foams of the absorbent) that has flown into the flue gas duct 4. In such a structure, when the foam wavefront 10 of the absorbent rises in the reservoir tank 3, and the foams of the absorbent flow back into the flue gas duct 4, the foams are collected by the draining unit 8. In this manner, the corrosions of the flue gas duct 4, caused by the foams flowing backwardly, are suppressed advantageously.

For example, in the embodiment, the draining unit 8 includes a weir 81, a draining line 82, and a pit 83 (see FIG. 5). In the draining unit 8, the weir 81 is arranged on the floor of the flue gas duct 4 to hold back the foams, of the absorbent, flowing backwardly through the entrance 21 on the absorber 2 into the flue gas duct 4. The draining line 82 is connected between the entrance 21 and the weir 81 on the floor of the flue gas duct 4. Therefore, the foams of the absorbent held back by the weir 81 in the flue gas duct 4 are effectively collected into the draining line 82. The draining line 82 is also connected to the pit 83. The foams collected from the flue gas duct 4 via the draining line 82 are reserved in the pit 83.

[Dispersing Unit]

Figure 6:
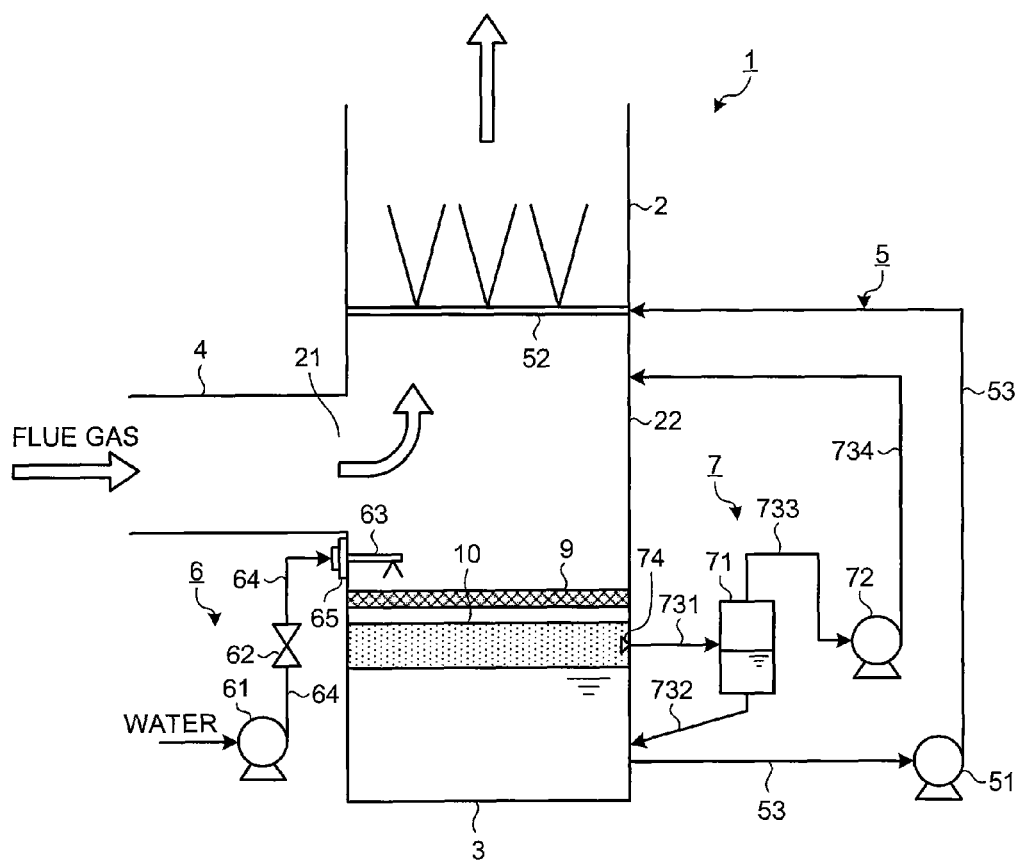
FIG. 6 is an illustrative schematic of another variation of the air pollution control apparatus shown in FIG. 1.

FIG. 6 is schematic of a structure of another variation of the air pollution control apparatus shown in FIG. 1. In FIG. 6, the same structural elements as those in the air pollution control apparatus 1 are given the same references signs, and the explanations thereof are omitted herein.

The characteristic of the air pollution control apparatus 1 is in that a dispersing unit 9 that disperses the absorbent that falls from the absorber 2 into the reservoir tank 3 is provided (See FIG. 6). More specifically, in the structure in which the reservoir tank 3 is arranged at the bottom of the absorber 2 and opens into the absorber 2, the dispersing unit 9 is provided to disperse the absorbent that falls from the absorber 2 and collected into the reservoir tank 3 through the opening of the reservoir tank 3. In such a structure, the absorbent falling from the absorber 2 unevenly is dispersed by the dispersing unit 9, and collected into the reservoir tank 3. Therefore, the absorbent is suppressed from foaming in the reservoir tank 3, in comparison with the structure in which such a dispersing unit is not installed. In this manner, a defect caused by the foams of the absorbent can be prevented effectively.

For example, in the embodiment, the dispersing unit 9 is made of a porous plate (for example, a punched metal, a grating, or a grid), or a mesh plate (see FIG. 6). The dispersing unit 9 covers the entire opening of the reservoir tank 3. Furthermore, the dispersing unit 9 is arranged right above (near) the surface of the absorbent in the reservoir tank 3, and below the entrance 21 on the absorber 2. In such a structure, the absorbent is sprayed from the spraying pipe 52 in the absorbent spraying unit 5; is brought into gas-liquid contact with the flue gas in the absorber 2; and falls unevenly in the absorber 2 to be collected into the reservoir tank 3. At this time, the falling absorbent hits the dispersing unit 9 covering the opening of the reservoir tank 3, to be dispersed (sprinkled evenly), and is collected into the reservoir tank 3. In this manner, the absorbent is suppressed from foaming in the reservoir tank 3.

According to the embodiment, the dispersing unit 9 is arranged below the diffusing nozzle 63 in the defoaming agent diffusing unit 6 (closer to the surface of the absorbent) (see FIG. 6). In such a structure, the defoaming agent diffused via the diffusing nozzle 63 is dispersed by the dispersing unit 9, and diffused over the foam wavefront 10 of the absorbent (the foam wavefront 10 near the entrance 21). This structure is preferable because the defoaming effect of the defoaming agent can be improved. The structure is not limited to the one described above, and the dispersing unit 9 may also be arranged above the diffusing nozzle 63 in the defoaming agent diffusing unit 6 (closer to the entrance 21) (not shown).

INDUSTRIAL APPLICABILITY

As described above, the air pollution control apparatus according to the present invention is useful for preventing a defect caused by the foams of the absorbent.

REFERENCES SIGNS LIST

1 air pollution control apparatus
2 absorber
21 entrance
22 body
3 reservoir tank
4 flue gas duct
5 absorbent spraying unit
51 pump
52 spraying pipe
53 pipe
6 defoaming agent diffusing unit
61 pump
62 valve
63 diffusing nozzle
64 pipes
65 attaching flange
7 foam-breaking unit
71 foam breaker
72 pump
731 to 734 pipe
74 collecting opening
8 draining unit
81 weir
82 draining line
83 pit
9 dispersing unit
10 foam wavefront

The invention claimed is:
1. An air pollution control apparatus comprising:
an absorber that serves as a passage for flue gas, the absorber having an entrance for the flue gas on a side thereof;
an absorbent spraying unit that sprays an absorbent into the absorber;
a reservoir tank that reserves therein the absorbent; and
a defoaming agent diffusing unit that diffuses a defoaming agent over foams of the absorbent in the reservoir tank, wherein
the flue gas is brought into gas-liquid contact with the absorbent in the absorber to process the flue gas while the flue gas is sent from a lower area toward an upper area of the absorber,
the absorbent after processing the flue gas is collected into and reserved in the reservoir tank,
the reservoir tank is arranged at a bottom of the absorber and opens into the absorber,
the defoaming agent diffusing unit is arranged above a foam wavefront of the absorbent in the reservoir tank, and below the entrance, and on a same plane as a plane on which the entrance is arranged, and
the defoaming agent diffusing unit diffuses the defoaming agent when processing of the flue gas is stopped.
2. The air pollution control apparatus according to claim 1, wherein a plurality of defoaming agent diffusing units is arranged along a boundary between a liquid surface of the absorbent in the reservoir tank and the entrance.
3. The air pollution control apparatus according to claim 1, wherein the defoaming agent diffusing unit is arranged in a detachable manner.
4. The air pollution control apparatus according to claim 1, further comprising:
a foam-breaking unit that extracts and breaks the foams of the absorbent in the reservoir tank, wherein
an entrance for the flue gas is arranged on a side of the absorber, and the foam-breaking unit extracts the foams of the absorbent from a position facing the entrance in the absorber and breaks the foams.
5. The air pollution control apparatus according to claim 1, wherein
an entrance for the flue gas is arranged on a side of the absorber,
a flue gas duct for supplying the flue gas into the absorber is connected to the entrance, and
the air pollution control apparatus further comprises a draining unit that collects a liquid flowing into the flue gas duct.
6. The air pollution control apparatus according to claim 1, wherein
the reservoir tank is arranged at a bottom of the absorber, and opens into the absorber, and
the air pollution control apparatus further comprises a dispersing unit that disperses the absorbing liquid falling and collected into the reservoir tank from the absorber through an opening of the reservoir tank.
7. An air pollution control apparatus comprising:
an absorber that serves as a passage for flue gas;
an absorbent spraying unit that sprays an absorbent into the absorber;
a reservoir tank that reserves therein the absorbent, wherein
the flue gas is brought into gas-liquid contact with the absorbent in the absorber to process the flue gas,
the absorbent after processing the flue gas is collected into and reserved in the reservoir tank, the air pollution control apparatus further comprises a foam-breaking unit that extracts and break foams of the absorbent in the reservoir tank,
an entrance for the flue gas is arranged on a side of the absorber, and
the foam-breaking unit extracts the foams of the absorbent from a position facing the entrance in the absorber and breaks the foams.

* * * * *